Figure 1:
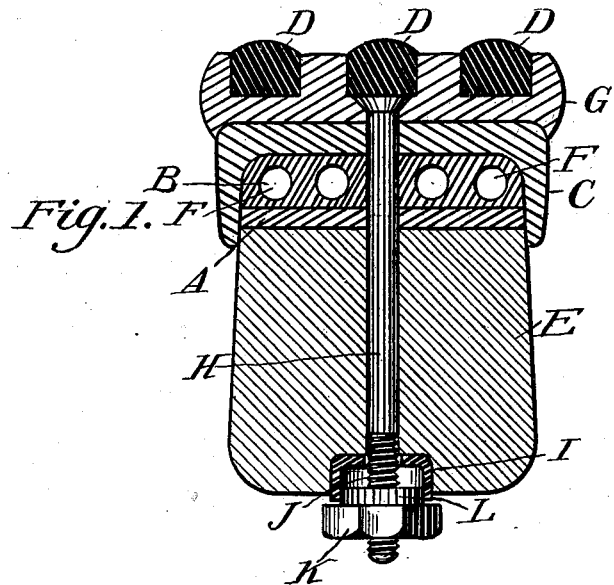

No. 674,256. Patented May 14, 1901.
H. M. DU BOIS.
TRACTION TIRE FOR VEHICLES.
(Application filed June 21, 1899.)
(No Model.)

WITNESSES:
Eugene C. Smith
Charles W. Low

INVENTOR
Howard M. DuBois
BY
James M. Ricks
ATTORNEY

UNITED STATES PATENT OFFICE.

HOWARD MALCOLM DU BOIS, OF ASHBURN, PENNSYLVANIA.

TRACTION-TIRE FOR VEHICLES.

SPECIFICATION forming part of Letters Patent No. 674,256, dated May 14, 1901.

Application filed June 21, 1899. Serial No. 721,406. (No model.)

*To all whom it may concern:*

Be it known that I, HOWARD MALCOLM DU BOIS, a citizen of the United States of America, and a resident of Ashburn, county of Montgomery, State of Pennsylvania, have invented and made certain new and useful Improvements in Traction-Tires for Vehicles; and I do hereby declare that the following is a full, clear, and exact description and specification of the same, reference being had to the accompanying drawings, forming part thereof.

My invention relates to traction-tires for vehicles using wooden wheels provided with fellies and retaining-tires, and particularly to those used upon trucks carrying heavy loads and to self-propelled vehicles, and is designed to provide elasticity suitable to the load the vehicle is to carry and to give greater durability and resistance to derangement, as well as to provide means for securing greater traction-power or hold upon the road-bed, and at the same time to so apply the outer traction rim or tire that it may be and is readily repaired; and to this end my invention consists in certain elements and combinations of elements, fully set forth in this specification and claimed at the end thereof.

In order that persons skilled in the art to which my invention appertains may understand, construct, and use my invention, I will proceed to describe it, referring to the drawings herewith, in which—

Figure 2:
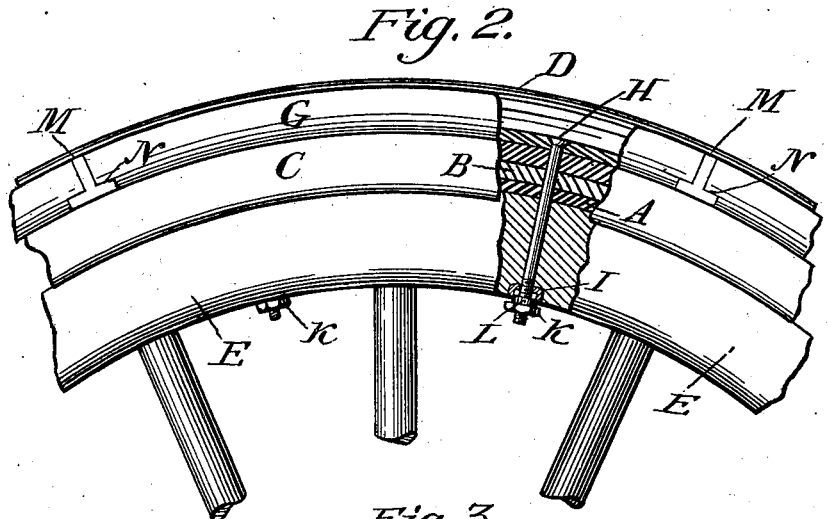
Figure 3:

Figure 1 is a cross-section of the felly of a wheel provided with my invention. Fig. 2 is a side view of a portion of a wheel broken away in part to show the various parts in section. Fig. 3 is a view of a detail in perspective.

E is the ordinary wooden felly of a vehicle-wheel.

A is the retaining-tire.

C is a double-flanged circular tire encompassing the felly and retaining-tire and inclosing between it and the felly of the wheel the perforated yielding cushion B, the side flanges also encompassing the sides of the felly E and retaining-tire A.

G G are sections of an outer traction-tire constructed to fit over the inner tire C and to protrude sidewise below the outer circumference of the tire C to hold or take the side thrust and hold the several sections firmly on the tire C.

H represents bolts which pass through the outer tire-sections and through tire C, cushion B, retaining-tire A, and felly E, and secured at their inner ends by a threaded nut K, having a rounded portion L. Cup-shaped sockets I are let into the under side of felly E, and rubber washers are placed in said sockets, so that when the nuts K are tightened up the bolts H are drawn radially against a yielding resistance, and thus secure the sections of the outer traction-tire G against or on the tire C. Two or more bolts are supplied for each separate section of G. Between the ends of the sections G of the outer traction-tire hard-rubber or equivalent pieces are inserted, as shown.

Each section of tire G is grooved, as shown, to receive vulcanized rubber or similar material, which is securely attached to the metal tire by cement or other suitable means. These rubber strips aid in giving better traction or hold upon the road-bed. Whenever a section of the traction-tire G becomes injured from any cause, another is readily placed in position without disturbing the other parts of the tire. This is a feature of great importance. The hard-rubber steps or division-pieces M, which separate the different segments of the tire G, act also as traction-pieces, as they pass directly across the tread of the tire, and also as yielding pieces or cushions when the tire as a whole is compressed in a cold upsetting-machine to give proper tension thereto.

The perforations F in the elastic or yielding cushion B are varied in each case to agree with the amount of elasticity required for the load which is to be carried on the vehicle to which the completed wheels are to be attached.

Having now fully described my invention and the manner in which I have embodied it, what I claim as new and as my invention, and desire to secure by Letters Patent, is—

1. The combination in a vehicle-wheel consisting of the felly, a yielding perforated cushion; retaining-tire; a double side-flanged tire inclosing between its inner circumference and the outer circumference of the felly or retaining-tire said perforated yielding cushion; and whose side flanges inclose the sides of the felly, retaining-tire and yielding cushion; a compound segmental tire, secured upon the outer circumference of said double-flanged tire, each segment being separately attached by bolts taking into said segments and passing through to the inner circumference of said felly, and yieldingly secured thereto by nuts taking onto said bolts and against a yielding cushion in said felly, all constructed, arranged and combined to operate, substantially as hereinbefore specified.

2. The combination for the rim of a vehicle traction-wheel consisting of a felly; retaining-tire; double side-flanged tire and yielding cushion, substantially such as specified; an outer detachable tire, composed of individual segments, each secured to the felly by bolts and nuts, substantially as described; each segment being separated from another by a hard-rubber division piece or step, and each segment being provided with grooves upon its outer surface containing vulcanized-rubber traction-strips firmly secured therein, all constructed, arranged and combined substantially as specified.

HOWARD MALCOLM DU BOIS.

Witnesses:
JAMES M. HICKS,
CHARLES W. LOW.